(12) United States Patent
DuPont

(10) Patent No.: US 8,894,424 B2
(45) Date of Patent: Nov. 25, 2014

(54) UNIVERSAL CLIP APPARATUS FOR SOLAR PANEL ASSEMBLY

(75) Inventor: Luc DuPont, Lans-en-Vercors (FR)

(73) Assignee: A. Raymond et Cie, Grenoble (FR)

( * ) Notice: Subject to any disclaimer, the term of this patent is extended or adjusted under 35 U.S.C. 154(b) by 196 days.

(21) Appl. No.: 13/593,892

(22) Filed: Aug. 24, 2012

(65) Prior Publication Data

US 2013/0102165 A1 Apr. 25, 2013

Related U.S. Application Data

(60) Provisional application No. 61/528,620, filed on Aug. 29, 2011.

(51) Int. Cl.
*H01R 13/648* (2006.01)
*F24J 2/46* (2006.01)

(52) U.S. Cl.
CPC .............. *F24J 2/4607* (2013.01); *Y02E 10/40* (2013.01); *Y02B 10/20* (2013.01)
USPC .......................................................... 439/95

(58) Field of Classification Search
USPC ........................... 439/95, 374, 377, 296, 927; 136/250–253, 244
See application file for complete search history.

(56) References Cited

U.S. PATENT DOCUMENTS

| | | |
|---|---|---|
| 3,122,604 A | 2/1964 | Cook |
| 3,528,050 A | 9/1970 | Hindenburg |
| 3,757,268 A | 9/1973 | Genovese et al. |
| 3,998,018 A | 12/1976 | Hodges |
| 4,029,384 A | 6/1977 | Reinwall, Jr. |
| 4,106,251 A | 8/1978 | Nelsson |
| 4,113,982 A | 9/1978 | Glaesel |
| 4,189,881 A | 2/1980 | Hawley |
| 4,195,895 A | 4/1980 | Ziegler |
| 4,215,677 A | 8/1980 | Erickson |
| 4,256,359 A | 3/1981 | Storck |
| 4,406,505 A | 9/1983 | Avramovich |

(Continued)

FOREIGN PATENT DOCUMENTS

| | | |
|---|---|---|
| DE | 102010022556 B3 | 6/2011 |
| EP | 0671581 A2 | 9/1995 |

(Continued)

OTHER PUBLICATIONS

A Raymond drawing entitled "Solar clip Specific part"; Part No. 214803-1-00, for non-grounding clip shown in Solardis brochure; 1 page (believed to have been offered for sale in U.S. or published on or before Jul. 7, 2010).

(Continued)

*Primary Examiner* — Jean F Duverne
(74) *Attorney, Agent, or Firm* — Harness, Dickey & Pierce, P.L.C.

(57) ABSTRACT

A solar panel assembly attachment apparatus is provided including a strut defining a generally U-shaped channel; an electrically conductive grounding clip; and a panel retainer. Upon insertion of the panel retainer into a housing receptacle of the clip, a clip slot and a panel body slot are aligned to allow passage of the portion of the solar panel frame. Advancing the solar panel frame through the aligned clip slot and panel body slot compresses a spring to secure the solar panel frame while barbs electrically connect and provide a ground to the solar panel frame.

28 Claims, 8 Drawing Sheets

(56) References Cited

U.S. PATENT DOCUMENTS

| | | | |
|---|---|---|---|
| 4,669,808 A | 6/1987 | Owen | |
| 4,833,848 A | 5/1989 | Guerin et al. | |
| 4,875,876 A | 10/1989 | O'Loughlin | |
| 4,993,959 A | 2/1991 | Randolph | |
| 5,092,939 A | 3/1992 | Nath et al. | |
| 5,108,055 A | 4/1992 | Kreinberg et al. | |
| 5,164,545 A | 11/1992 | Kreinberg et al. | |
| 5,232,518 A | 8/1993 | Nath et al. | |
| 5,409,549 A | 4/1995 | Mori | |
| 5,419,606 A | 5/1995 | Hull et al. | |
| 5,451,167 A | 9/1995 | Zielinski et al. | |
| 5,571,338 A | 11/1996 | Kadonome et al. | |
| 5,762,720 A | 6/1998 | Hanoka et al. | |
| 6,105,317 A | 8/2000 | Tomiuchi et al. | |
| 6,106,310 A | 8/2000 | Davis et al. | |
| 6,111,189 A | 8/2000 | Garvison et al. | |
| 6,186,698 B1 | 2/2001 | Knapp | |
| 6,269,596 B1 | 8/2001 | Ohtsuka et al. | |
| 6,276,947 B1 | 8/2001 | Homfeldt et al. | |
| 6,370,828 B1 | 4/2002 | Genschorek | |
| 6,405,494 B1 | 6/2002 | Wismeth | |
| 6,495,750 B1 | 12/2002 | Dinwoodie | |
| 6,501,013 B1 | 12/2002 | Dinwoodie | |
| 6,534,703 B2 | 3/2003 | Dinwoodie | |
| 6,570,084 B2 | 5/2003 | Dinwoodie | |
| 6,672,018 B2 | 1/2004 | Shingleton | |
| 6,784,360 B2 | 8/2004 | Nakajima et al. | |
| 6,809,253 B2 | 10/2004 | Dinwoodie | |
| 6,959,517 B2 | 11/2005 | Poddany et al. | |
| 7,150,661 B2 | 12/2006 | Cisey | |
| 7,195,513 B1 | 3/2007 | Gherardini et al. | |
| 7,217,058 B2 | 5/2007 | Herb | |
| 7,260,918 B2 | 8/2007 | Liebendorfer | |
| 7,297,866 B2 | 11/2007 | Aschenbrenner | |
| 7,435,134 B2 | 10/2008 | Lenox | |
| 7,592,537 B1 | 9/2009 | West | |
| 7,600,349 B2 | 10/2009 | Liebendorfer | |
| 7,621,487 B2 | 11/2009 | Brown et al. | |
| 7,634,875 B2 | 12/2009 | Genschorek | |
| 7,686,625 B1 | 3/2010 | Dyer et al. | |
| 7,731,544 B2 | 6/2010 | Ma et al. | |
| 7,745,722 B2 | 6/2010 | Warfield et al. | |
| 7,748,175 B2 | 7/2010 | Liebendorfer | |
| 7,758,011 B2 | 7/2010 | Haddock | |
| 7,766,292 B2 | 8/2010 | Liebendorfer | |
| 7,780,472 B2 | 8/2010 | Lenox | |
| 7,797,883 B2 | 9/2010 | Tarbell et al. | |
| 7,866,099 B2 | 1/2011 | Komamine et al. | |
| 7,921,607 B2 | 4/2011 | Thompson et al. | |
| 7,971,398 B2 | 7/2011 | Tweedie | |
| 7,987,641 B2 | 8/2011 | Cinnamon | |
| 8,025,508 B2 | 9/2011 | Parker et al. | |
| 8,092,129 B2 | 1/2012 | Wiley et al. | |
| 8,109,048 B2 | 2/2012 | West et al. | |
| 8,256,169 B2 | 9/2012 | Cusson et al. | |
| 8,353,650 B2 | 1/2013 | Wiley et al. | |
| 8,713,881 B2 | 5/2014 | DuPont et al. | |
| 8,745,935 B2 | 6/2014 | DuPont et al. | |
| 8,806,813 B2 * | 8/2014 | Plaisted et al. | 52/173.3 |
| 8,813,441 B2 * | 8/2014 | Rizzo | 52/173.3 |
| 2003/0101662 A1 | 6/2003 | Ullman | |
| 2003/0177706 A1 | 9/2003 | Ullman | |
| 2004/0000334 A1 * | 1/2004 | Ressler | 136/251 |
| 2006/0156648 A1 | 7/2006 | Thompson et al. | |
| 2008/0035140 A1 | 2/2008 | Placer et al. | |
| 2008/0053517 A1 | 3/2008 | Plaisted et al. | |
| 2008/0245404 A1 | 10/2008 | DeLiddo | |
| 2009/0019796 A1 | 1/2009 | Liebendorfer | |
| 2009/0242014 A1 | 10/2009 | Leary | |
| 2010/0180933 A1 | 7/2010 | Aftanas et al. | |
| 2010/0192505 A1 | 8/2010 | Schaefer et al. | |
| 2010/0236162 A1 | 9/2010 | Tweedie | |
| 2010/0236542 A1 | 9/2010 | Pierson et al. | |
| 2010/0263297 A1 | 10/2010 | Liebendorfer | |
| 2010/0276558 A1 | 11/2010 | Faust et al. | |
| 2011/0036028 A1 | 2/2011 | Beck | |
| 2011/0039430 A1 | 2/2011 | Aftanas | |
| 2011/0100433 A1 | 5/2011 | Jonczyk | |
| 2011/0138585 A1 | 6/2011 | Kmita et al. | |
| 2011/0147553 A1 | 6/2011 | Ostermeier et al. | |
| 2011/0179606 A1 | 7/2011 | Magno, Jr. et al. | |
| 2011/0203637 A1 | 8/2011 | Patton et al. | |
| 2011/0214366 A1 | 9/2011 | Haddock et al. | |
| 2011/0232212 A1 | 9/2011 | Pierson et al. | |
| 2011/0284058 A1 | 11/2011 | Cinnamon | |
| 2012/0240489 A1 | 9/2012 | Rivera et al. | |
| 2012/0244729 A1 | 9/2012 | Rivera et al. | |
| 2013/0078053 A1 | 3/2013 | Wiley et al. | |

FOREIGN PATENT DOCUMENTS

| | | | |
|---|---|---|---|
| FR | 2163787 A5 | 7/1973 | |
| FR | 2209024 A1 | 6/1974 | |
| GB | 423385 A | 1/1935 | |
| GB | 1218275 A | 1/1971 | |
| GB | 1510258 A | 5/1978 | |
| JP | 7243428 A | 9/1995 | |
| JP | 10266499 A | 10/1998 | |
| JP | 10339008 A | 12/1998 | |
| KR | 1020110116416 | 10/2011 | |
| NL | 8304155 A | 7/1985 | |
| WO | WO-8301476 A1 | 4/1983 | |
| WO | WO-9816699 A1 | 4/1998 | |
| WO | WO-2010149278 A1 | 12/2010 | |

OTHER PUBLICATIONS altEstore; Internet Advertisement Publication; "Groundings Lugs With Set Screw"; www.altestore.com; Aug. 25, 2011.

Rayvolt; Internet Advertisement Publication; "Panel fasteners"; Raygroup; May 2011.

Solardis; Brochure; "soprasolar fix"; www.soprasolar.com; Jul. 7, 2010; pp. 1-10.

* cited by examiner

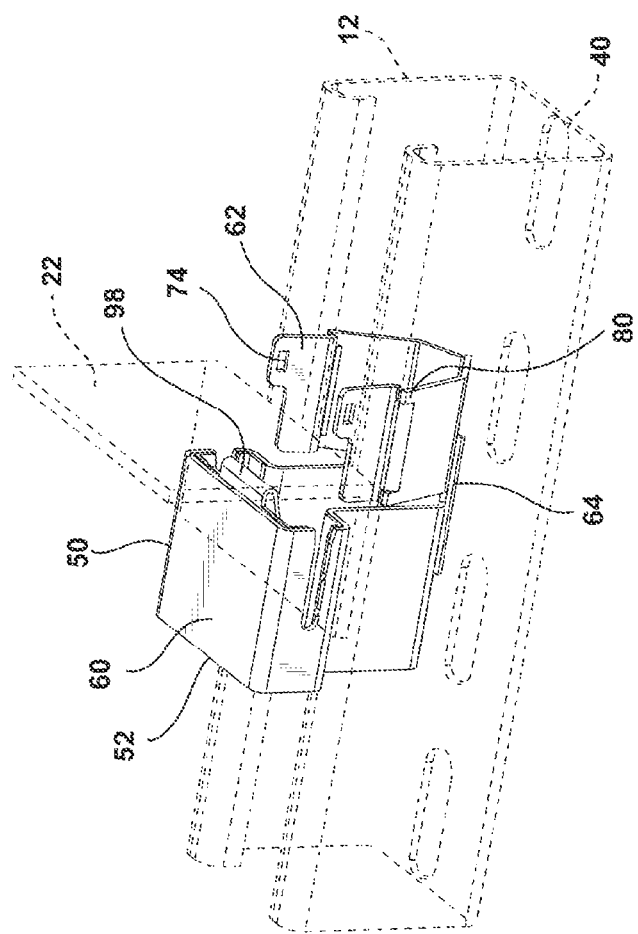
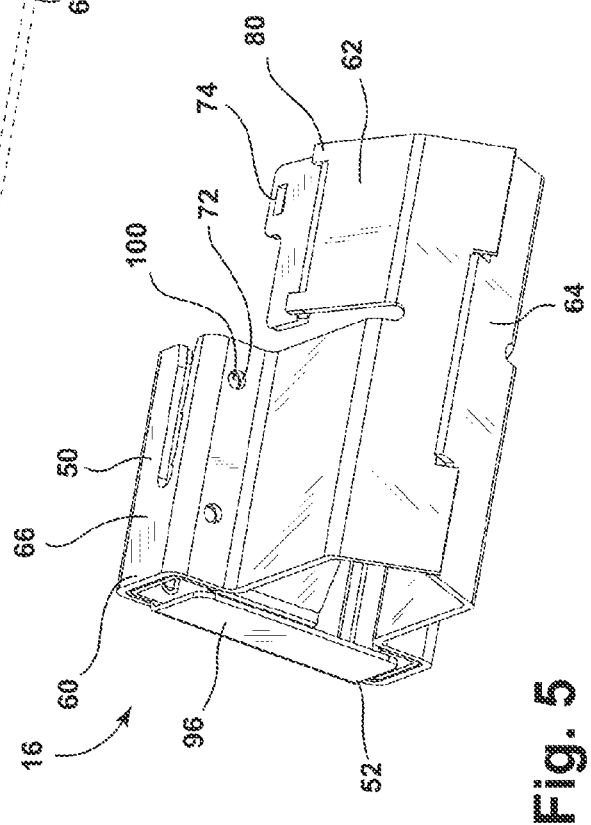

UNIVERSAL CLIP APPARATUS FOR SOLAR PANEL ASSEMBLY

CROSS-REFERENCE TO RELATED APPLICATIONS

This application claims the benefit of U.S. Provisional Application Ser. No. 61/528,620, filed on Aug. 29, 2011, which is incorporated by reference herein.

BACKGROUND AND SUMMARY

The present teachings relate generally to a universal clip apparatus for a solar panel assembly and more particularly to a grounding clip which attaches a solar panel frame to a strut.

Traditionally, peripheral mounting frames holding solar or photovoltaic panels are mounted to a supporting structure on a building roof or on the land through use of threaded fasteners and multi-piece brackets. Exemplary traditional devices are disclosed in U.S. Pat. No. 7,758,011 entitled "Adjustable Mounting Assembly for Standing Seam Panels" which issued to Haddock on Jul. 20, 2010, and U.S. Pat. No. 6,105,317 entitled "Mounting System For Installing an Array of Solar Battery Modules of a Panel-Like Configuration on a Roof" which issued to Tomiuchi et al. on Aug. 22, 2000. These patents are incorporated by reference herein. These devices, however, solely provide frame retention, and are time consuming and complex to install on a job site, such as on top of a windy roof, which thereby incurs significant labor expense and effort.

Another solar panel module fastener is disclosed in German Patent Publication No. 10 2010 022 556 by Klaus Hullmann et al. While this fastener is a noteworthy advance in the industry, further improvements are desirable.

Finally, various conventional devices have been used to provide electrical grounding to solar panel assemblies. For example, a grounding lug is attached to a solar panel frame by screws and a wire that extends through a cradle of the lug is retained therein by one or more set screws. An example of this is disclosed in FIG. 1 and the background section of U.S. Pat. No. 7,195,513 entitled "Self-Locking Wire Termination Clip" which issued to Gherardini et al. on Mar. 27, 2007, and is incorporated by reference herein. This patent highlights many of the disadvantages of this lug and threaded fastener approach. Furthermore, this conventional lug and threaded fastener device is time consuming and difficult to install on site and is not easily suited for pre-assembly.

In accordance with the present invention, a solar panel assembly attachment apparatus is provided. In one aspect, the solar panel assembly attachment apparatus includes: a strut defining a generally U-shaped channel; an electrically conductive grounding clip; and a panel retainer. In another aspect, electrically conductive grounding clip includes a strut engaging surface; a flexible securing region that is actuable to advance a portion of the clip into a generally U-shaped channel; a housing defining a housing receptacle; at least one barb internally projecting from at least one wall defining the housing receptacle; and a clip slot adapted to receive a portion of a solar panel frame. A further aspect provides a panel retainer which includes: a panel body defining a panel body slot; and a spring disposed in the panel body slot. Upon insertion of the panel retainer into the housing receptacle, the clip slot and the panel body slot are aligned to allow passage of the portion of the solar panel frame therethrough. Further, advancing the solar panel frame through the aligned clip slot and panel body slot compresses the spring to thereby secure the solar panel frame while barbs electrically connect and provide a ground to the solar panel frame.

In other features, the present teachings provide a solar panel assembly apparatus including an elongated and rigid strut including a pair of opposed internal surfaces defining a channel therebetween; a solar panel frame including a lateral flange; a clip comprising a housing defining a housing slot having a plurality of barbs, the housing being coupled to flexible securing wings; and a panel retainer fitting within a housing of the clip and defining a panel slot which aligns with the housing slot when the panel retainer is within the housing. The flange of the frame is linearly slid into the aligned housing slot and panel slot so the at least one barb engages the frame. The flexible securing wings are actuated and linearly inserted into the channel of the strut so the flexible securing wings snap into engagement with the internal surfaces of the strut. Further, the at least one barb grounding the clip to the frame and the clip attach the frame to the strut.

In still other aspects, methods of grounding a solar panel frame and attaching the frame to a rigid strut are provided. A metallic clip is linearly pushed onto a portion of the solar panel frame. At least one barb of the clip is compressed into the portion of the frame while simultaneously compressing a spring retained within the clip. Wings of the clip are then flexibly snapped into the rigid strut. The clip provides grounding for the frame and attaches the frame to the strut in primarily linear, unthreaded installation motions.

In still additional aspects, a solar panel assembly is provided. A strut defines a U-shaped channel. First and second electrically conductive grounding clips include a housing adapted to be flexibly secured within the U-shaped channel and tabs to abut a downwardly turned edge of the strut to resist removal of the clip. The tabs further define at least one window. A bridge provides an electrical connection between the first electrically conductive grounding clip and the second electrically conductive grounding clip. The bridge further includes a first barb to gouge the first grounding clip and a second barb to gouge the second grounding clip and a first tab having an interference fit with the at least one first window and a second tab having an interference fit with the at least one second window.

The present apparatus and assembly are advantageous over traditional devices. For example, the universal clip apparatus is inexpensive to manufacture and install. Furthermore, the present universal clip apparatus is suitable for pre-assembly to the frame offsite or at a manufacturing plant, thereby improving quality and reducing assembly cost. Moreover, the present universal clip apparatus allows for simple linear frame attachment and increases the electrical grounding continuity and reliability to the solar panel frame as compared to conventional devices. Additional advantages and features of the present invention will become apparent from the following description and appended claims.

BRIEF DESCRIPTION OF THE DRAWINGS

The drawings described herein are for illustrative purposes only of selected embodiments and not all possible implementations, and are not intended to limit the scope of the present disclosure.

FIG. 4 is a side perspective view of an assembled apparatus;

FIG. 5 is a bottom view of an assembled universal clip and panel retainer;

DETAILED DESCRIPTION

Figure 1:
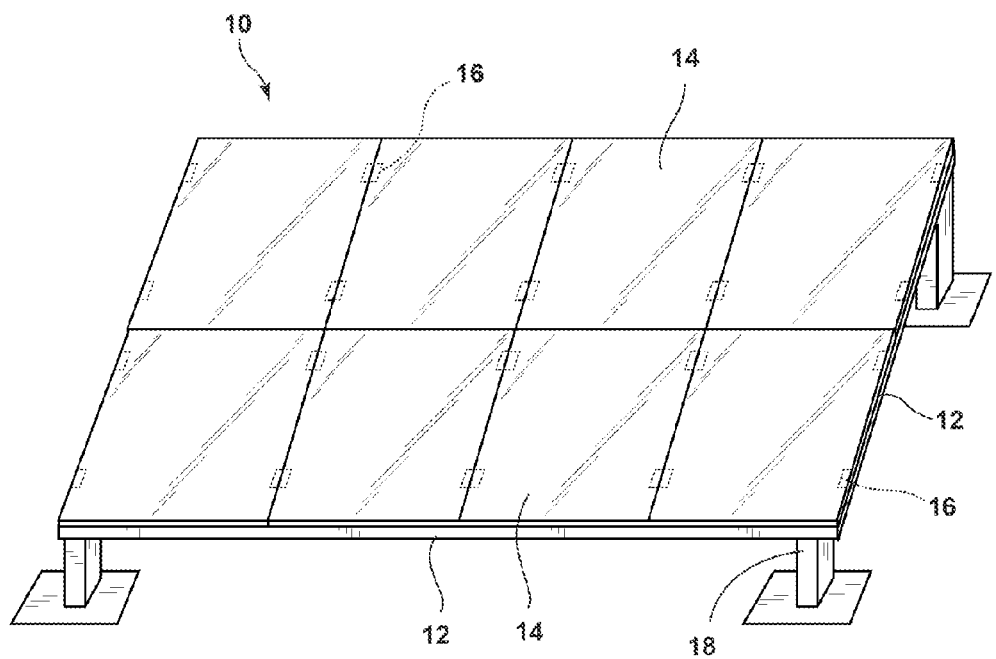
FIG. 1 is a perspective view showing a fastening assembly for a solar panel assembly in a fully installed condition.
Figure 2:
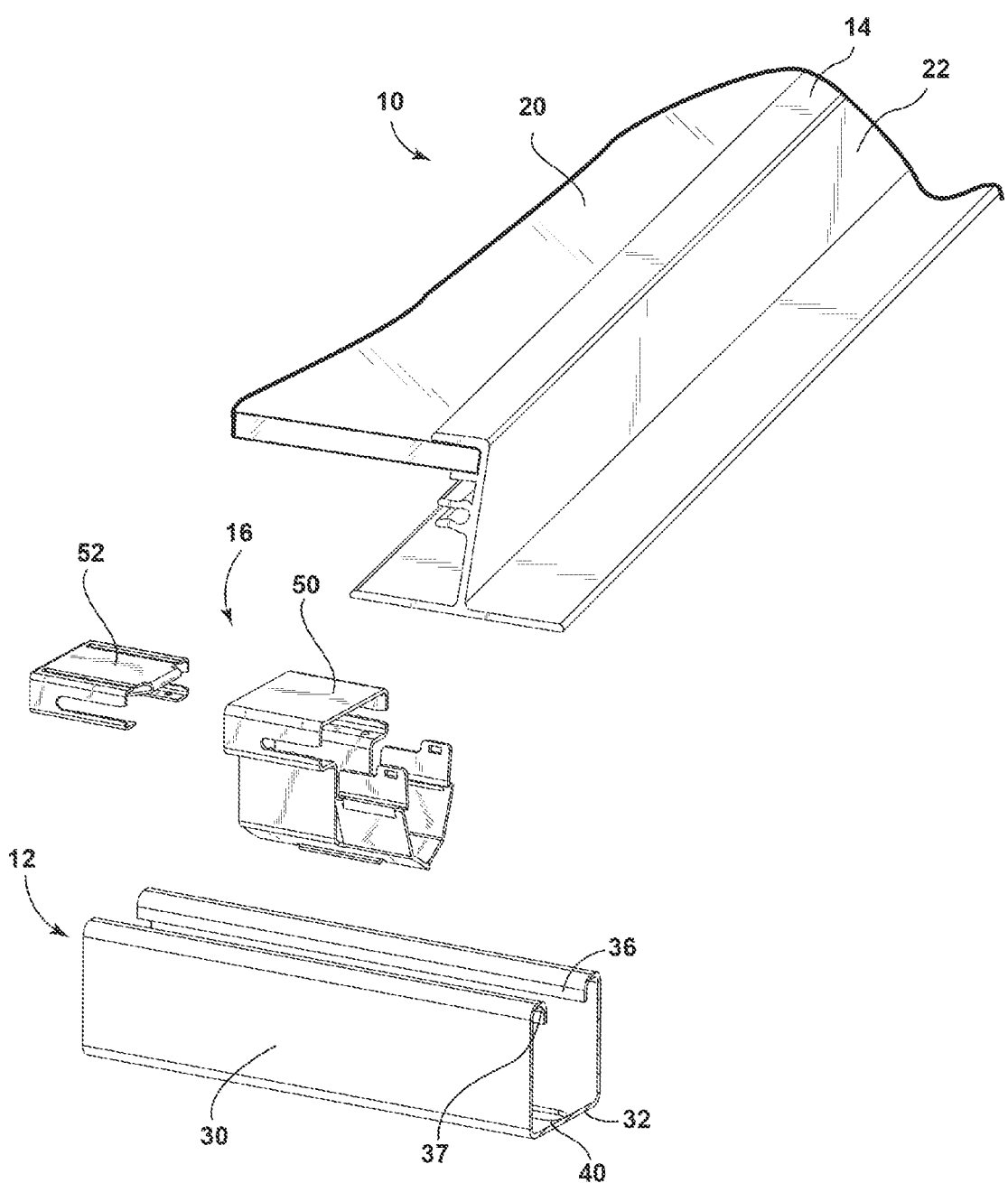
FIG. 2 is an exploded perspective view showing the apparatus.
Figure 3:
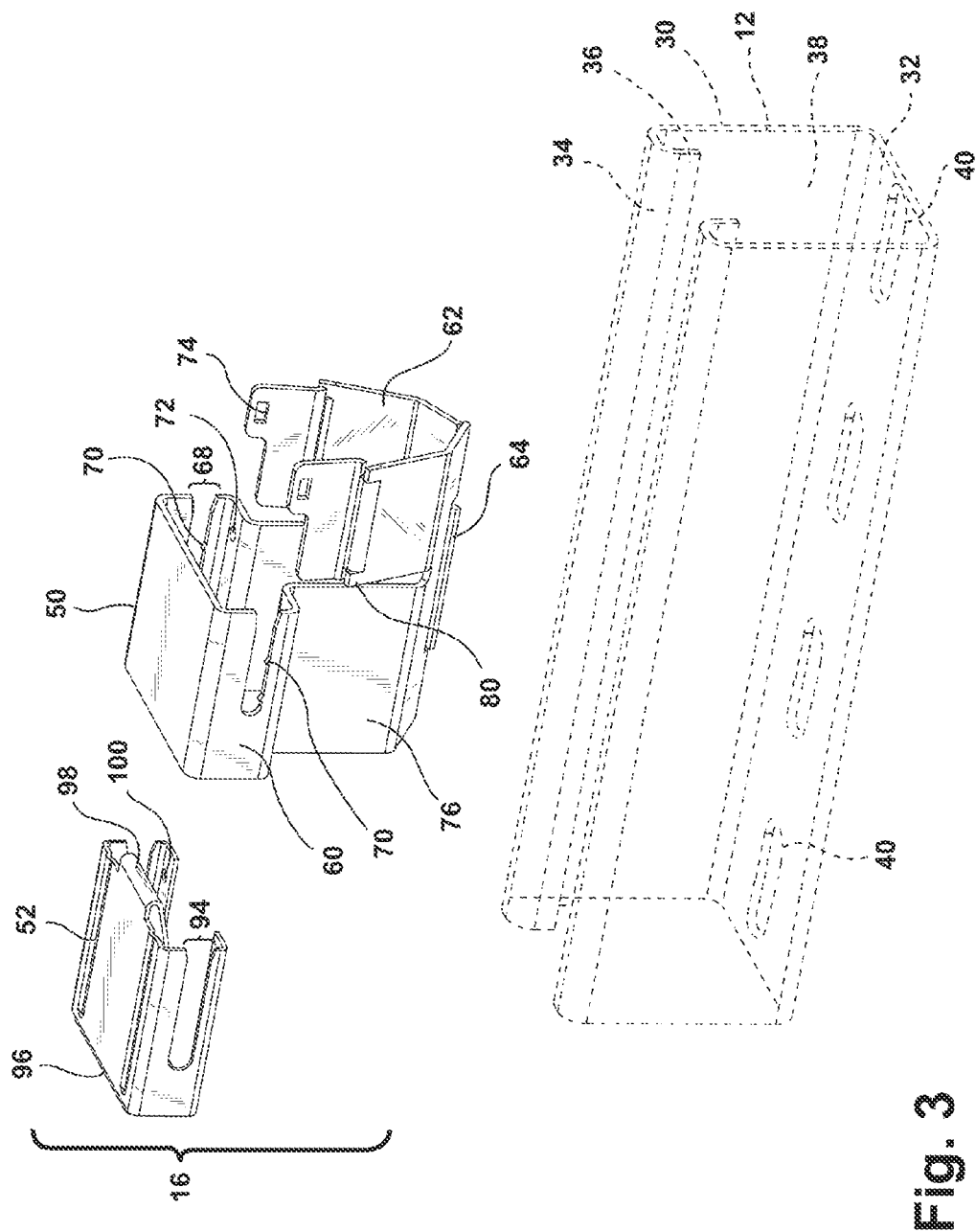
FIG. 3 is a side perspective view of an exploded fastening assembly including a universal clip and panel retainer.

Referring to FIGS. 1-3, a solar panel assembly attachment apparatus 10 includes elongated and rigid struts 12, solar panel modules or assemblies 14, and fastening assemblies 16. Struts 12 are mounted to vertical legs 18 attached to land, or struts 12 are bolted onto a roof clamp or other structure on a top or side of a building or structure. Each solar panel assembly 14 includes a glass photovoltaic panel 20 and a metallic frame 22, which may be coated with a substrate. Glass photovoltaic panel 20 and metallic frame 22 are provided as a pre-assembled unit or may be provided as separate units.

As best shown in FIG. 2, strut 12 has a uniform and generally U-shaped cross-section as defined by upstanding sidewalls 30 joined by a bottom wall 32. A reverse-turned wall 34 extends from a top end of each sidewall 30 and terminates in a downwardly directed edge 36. Downwardly directed edge 36 provides a folded-over region of upstanding sidewalls 30 and as detailed below provide attachment points for fastening assemblies 16. An elongated slot or channel 38 is defined between reverse turn walls 34. Optional mounting holes 40 are provided in bottom wall 32 to allow for securing of strut 12 to a building attachment or bolt. Strut 12 is, in various aspects, stamped or rolled from aluminum or steel.

FIG. 3 shows an exploded view of fastening assembly 16 with respect to strut 12. FIG. 4 shows an assembled fastening assembly 16 securing a partial cutaway depiction of metallic frame 22 of a solar panel assembly 14, particularly shown as part of a flange of the metallic frame 22. Fastening assembly 16 includes a universal clip 50 and a panel retainer 52.

Universal clip 50 is shown in various views in FIGS. 6-9. Universal clip 50 includes a housing region 60, a flexible securing region 62 (or wings), and a bottom brace 64. Housing region 60 includes a housing top 66 that when universal clip 50 is inserted into strut 12, housing top 66 sits proud with respect to an upper surface of strut 12. A housing slot 68 is defined through a portion of housing top 66. At least one, and preferably two, housing barbs 70 are disposed along each housing slot 68 to provide redundant grounding paths. Housing slot 68 is used to receive a portion of metallic frame 22 to secure solar panel assembly 14. Along an underside of housing top 66 are housing bores 72, as best shown in FIG. 5. Housing bores 72 are spaced-apart along an underside of housing top 66 and contact an upper surface of strut 12. While two housing bores 72 are depicted along the one side of housing top 66, it is understood that one or more than two housing bores 72 may be placed along a side of housing top 66. Further, it is understood that the number of housing bores 72 need not match along each side of housing top 66. For example, a first side would include three housing bores 72, and a second side would include four housing bores 72. Housing region 60 further includes a housing bottom 76 which is contained within the channel 38 defined by strut 12.

Flexible securing region 62 of universal clip 50 is used to advance universal clip 50 into the channel 38 defined by strut 12 (as shown in FIG. 4). Flexible securing region 62 is compressed to allow universal clip 50 to fit within U-shaped channel 38 and is subsequently released to cause flexible securing region 62 to flex outwardly and bear against sidewalls 30 to thereby removably fix universal clip 50 and panel retainer 52 contained therein into strut 12. Flexible securing region 62 further includes windows 74 that also sit proud with respect to an upper surface of strut 12 when fastening assembly 16 is disposed and secured in strut 12. Housing tabs 80 located along flexible securing region 62 extend away from flexible securing region 62 and contact an inner surface of sidewalls 30 to provide electrical contact with strut 12 and also secure the fastening assembly 16 by engaging downwardly turned edge 36 of strut 12 and thereby preventing unintentional dislodging. The electrical contact may be used to ground solar panel assembly attachment apparatus 10 or respective solar panel assemblies 14. Advantageously, the present teachings provide both metallic frame 22 and a frame-to-strut attachment.

Housing bottom 76 links housing top 66 to flexible securing region 62. Brace 64 is disposed along at least a region of housing bottom 76 and/or at least a region of flexible securing region 62 to prevent buckling or excessive compression of universal clip 50. This allows universal clip 50 to retain its shape through an initial installation and, if warranted, through removal and subsequent installation.

With reference to FIGS. 3, 5-7, and 10, panel retainer 52 is shown in alignment with universal clip 50. Advancement of panel retainer 52 toward housing top 60 secures panel retainer 52 within universal housing clip 50 and thus secures metal frame 22 of solar panel assembly 14.

Figure 6:
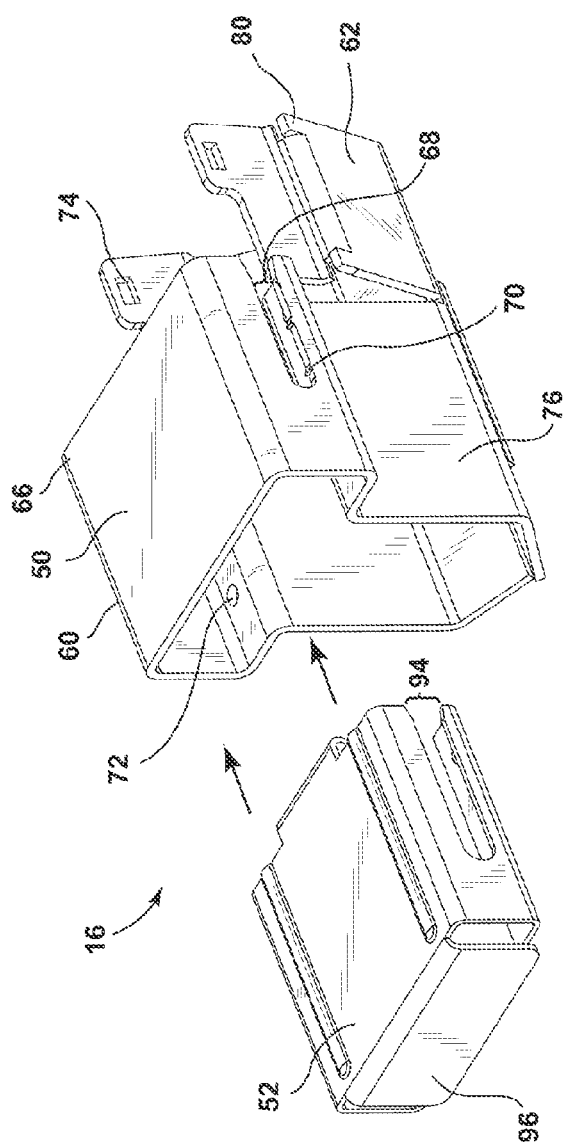
FIG. 6 is a side perspective view of a universal clip and panel retainer.
Figure 7:
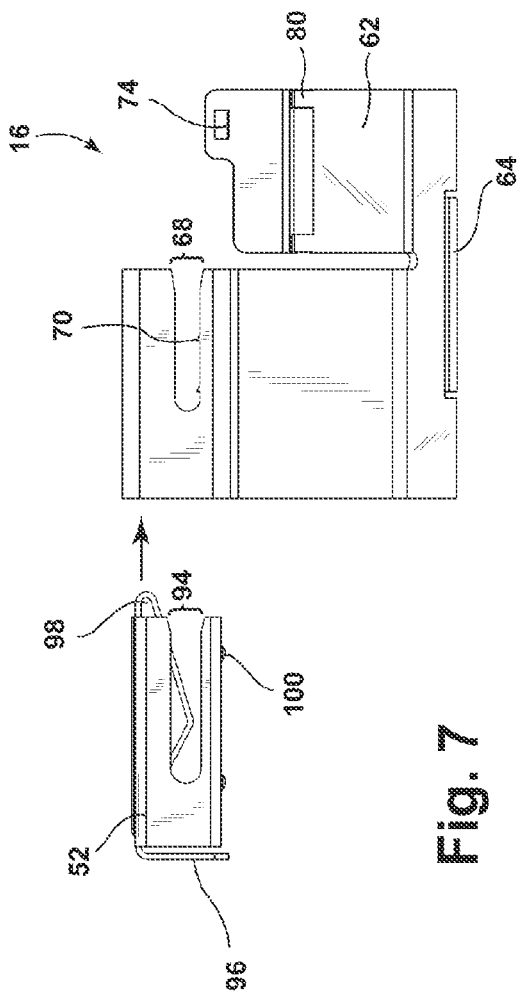
FIG. 7 is a side elevational view of a universal clip and panel retainer.
Figure 8:
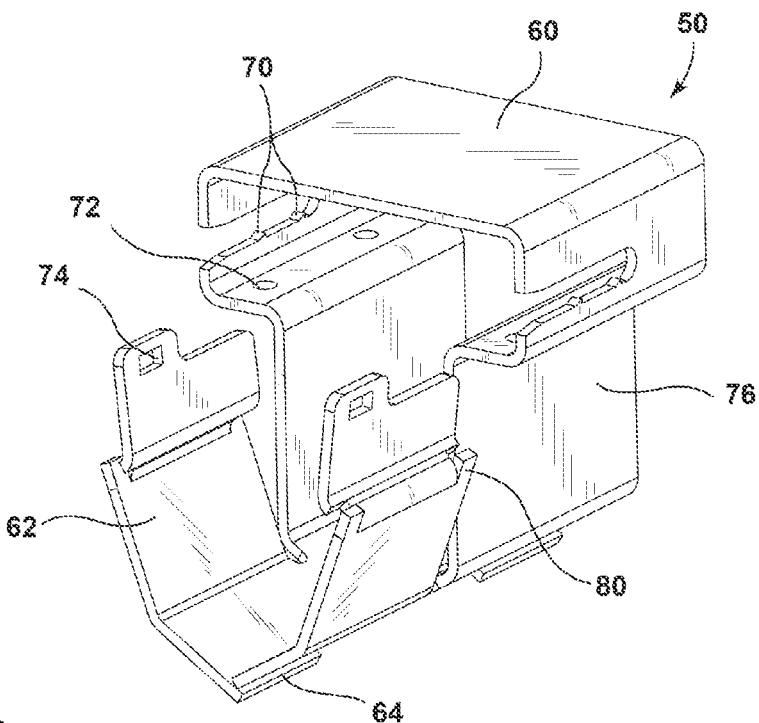
FIG. 8 is a side perspective view of a universal clip.
Figure 9:
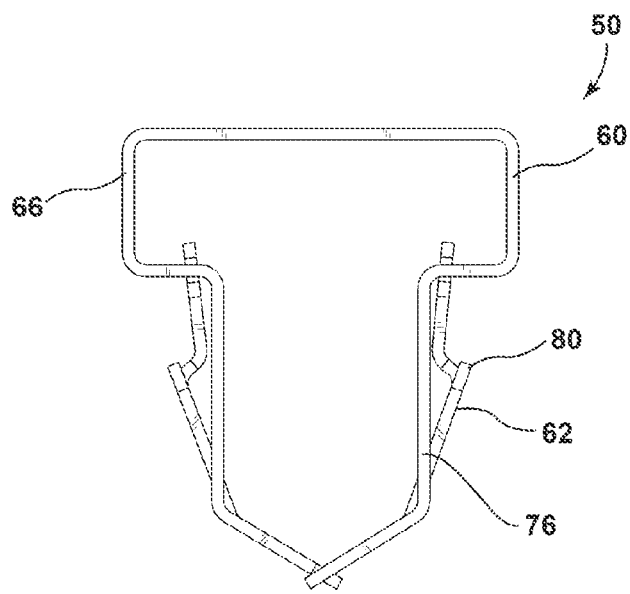
FIG. 9 is an end elevational view of a universal clip.
Figure 10:
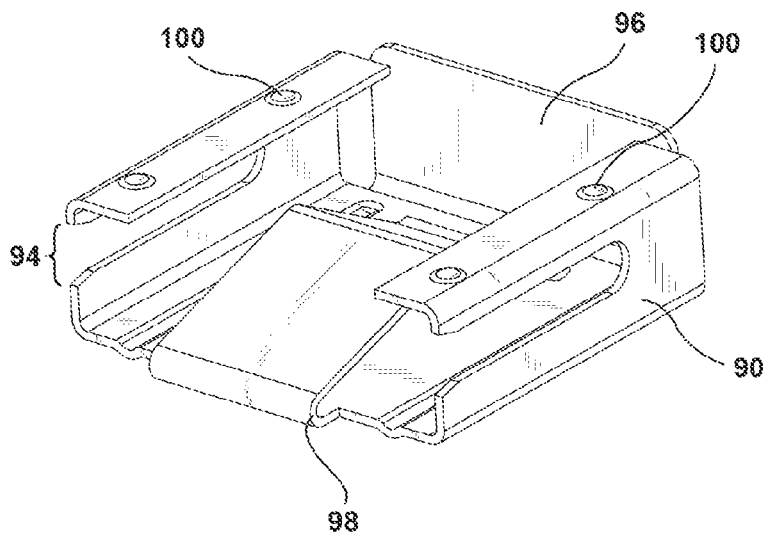
FIG. 10 is a front perspective view of an underside of a panel retainer.
Figure 11:
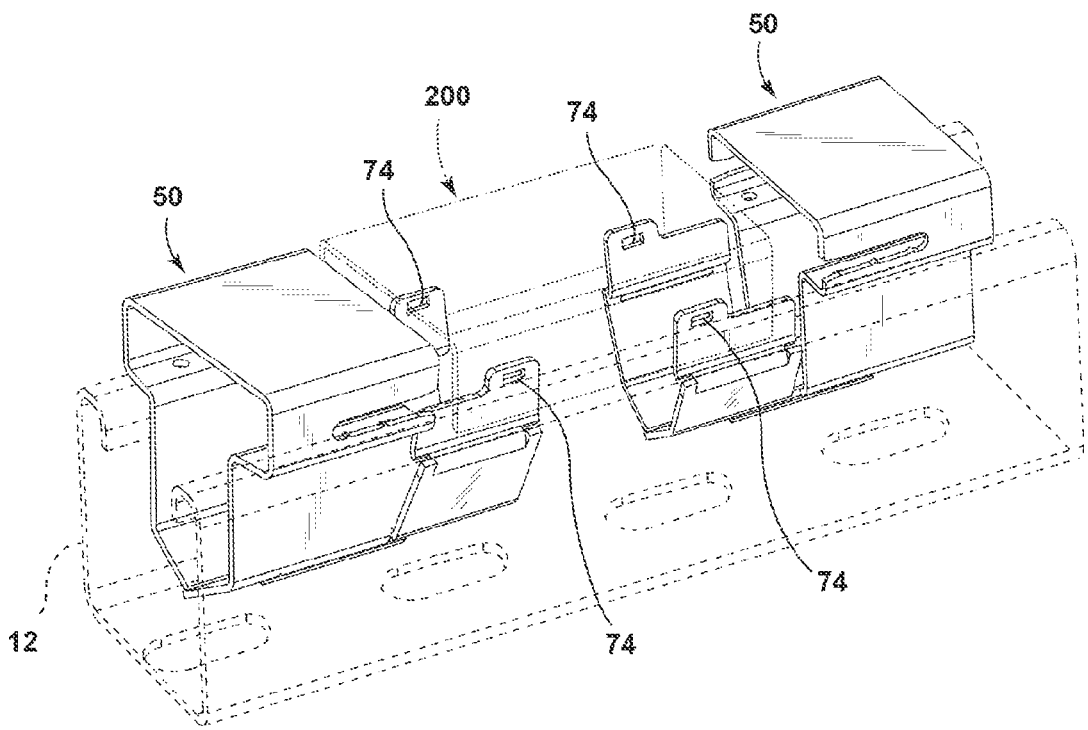
FIG. 11 is a side perspective view of two universal clips connected with a bridge.

Panel retainer 52 includes a panel body 90 defining a panel retainer slot 94, a panel back 96, a spring 98, and at least one detent 100. As shown in FIGS. 5-7, when panel retainer 52 fits within housing 60 in housing top 66, detents 100 on panel retainer 52 mate with bores 72 on universal clip 50 to removably interlock universal clip 50 with panel retainer 52. Further, panel slot 94 and housing slot 68 are aligned to allow passage of metallic frame 22 therethrough.

As best shown in FIG. 7, spring 98 extends into a passageway defined by panel retaining slot 94. A portion of spring 98 extends beyond a front portion of panel retainer 52. Although not shown, spring 98 may alternately be contained entirely within panel retainer 52 and still be within the scope of the present teachings. Placement of spring 98 causes it to be pushed upwards when metallic frame 22 is advanced through slot 94 and housing slot 68. Compression of spring 98 along with mating of detents 100 with bores 72 provide fixation of panel retainer 52 within housing 60 and secure metallic frame 22 therebetween while compressing barbs 70 into the bottom surface of frame 22 in a locking manner without the need for tool or threaded screws.

When fully installed, the solar panel hides a majority of the fastening assembly 16. This feature advantageously deters theft of the solar panel assembly 14 by making it less clear to a casual observer that compression together of the flexible securing regions 62 will allow detachment of the universal clip 50 from strut 12. Universal clip 50 and/or panel retainer 52 are preferably stamped from a Magni coated spring steel, but alternately may be stamped from stainless steel.

Turning to FIGS. 11-14, in various aspects, a bridge 200 is used to connect universal clips 50 (and thus fastening assemblies 16). The connection of a plurality of universal clips 50 facilitates electrical grounding of the solar panel assembly 10. For example, should each universal clip 50 in a solar panel assembly 10 be electrically connected using bridges 200, only a single terminal universal clip 50 or fastening assembly 16 of the many attached to each strut would need to be electrically grounded through the use of a copper wire or an eyelet to a separately wired circuit. This simplifies installation and reduces installation costs.

Figure 12:
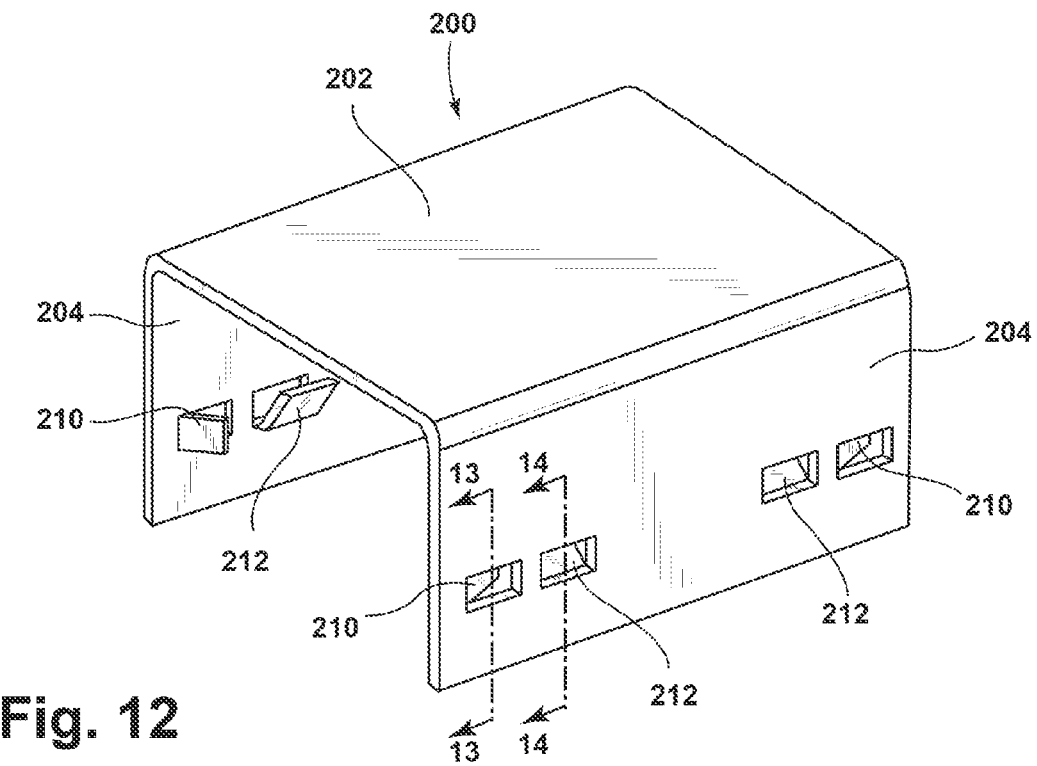
FIG. 12 is a side perspective view of a bridge.
Figure 13:
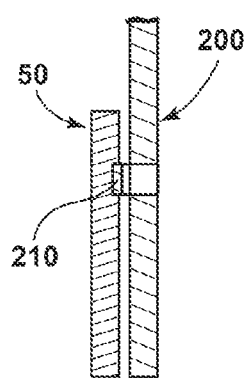
FIG. 13 is a cross-sectional view along line 13-13 of FIG. 12.
Figure 14:
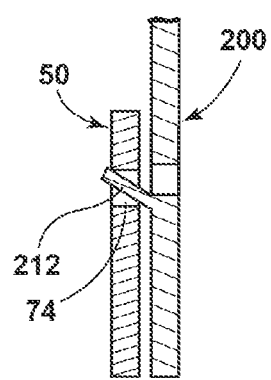
FIG. 14 is a cross-sectional view along line 14-14 of FIG. 12.

As shown in FIG. 12, bridge 200 includes a top surface 202 and at least two walls 204 extending from top surface 202. At least one sidewall includes at least one barb 210 and at least one tab 212. As shown in FIG. 13, barb 210 penetrates a portion of universal clip 50 to place bridge 200 in electrical connection with universal clip 50. As shown in FIG. 14, tab 212 fits within window 74 of universal clip 50 to secure bridge 200 to universal clip 50.

In an embodiment including bridge 200, at least two universal clips 50 are installed. These universal clips 50 are either immediately adjacent and in the same strut 12 or within a close enough proximity so that bridge 200 is able to span between universal clips 50. Bridge 200 is aligned over flexible securing region 62 and windows 74 such that windows 74 are aligned with tabs 212 of bridge. Upon advancing bridge 200 towards universal clips 50, barbs 210 pierce universal clip 50. Still further upon advancing bridge 200 towards universal clips 50, tabs 212 ride along a surface of bridge 200 until reaching windows 74 and then extend through windows 74 as shown in FIG. 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. Moreover, when the terms "top," "bottom," "upper," "lower," "side," "end," "above," "below," or the like are used, it is not intended to limit the orientation of the part since it is envisioned that the present apparatus can be inverted or positioned at many different orientations. The same may also be varied in many ways. Such variations are not to be regarded as a departure from the disclosure, and all such modifications are intended to be included within the scope of the disclosure.

The invention claimed is:

1. A solar panel assembly attachment apparatus comprising:
    (a) an electrically conductive grounding clip comprising:
        (i) a strut-engaging surface;
        (ii) a flexible securing region adapted to secure a portion of the clip in a strut channel;
        (iii) a housing including a housing receptacle;
        (iv) at least one barb internally projecting from at least one surface of the housing receptacle; and
        (v) a clip slot adapted to receive a portion of a solar panel frame;
    (b) a panel retainer comprising:
        (i) a panel body including a panel body slot; and
        (ii) a spring disposed in the panel body slot,
    wherein upon insertion of the panel retainer into the housing receptacle, the clip slot and the panel body slot are aligned and adapted to receive the portion of the solar panel frame therein; and
    wherein the spring is adapted to compress the solar panel frame against the at least one barb to electrically connect and provide a ground to the solar panel frame.

2. The apparatus according to claim 1, wherein the electrically conductive grounding clip further includes a base to deter buckling of the flexible securing region.

3. The apparatus according to claim 1, wherein the flexible securing region further defines at least one opening adapted to provide an electrical connection with a second electrically conductive grounding clip.

4. The apparatus according to claim 1, wherein the at least one barb is adapted to engage and ground a flange of the solar panel frame.

5. The apparatus according to claim 1, further comprising at least four spaced apart barbs which gouge into at least one coated surface of the solar panel frame when installed.

6. The apparatus of claim 1, further comprising a glass solar panel mounted to the frame and hiding a majority of the clip when completely attached to the strut, the strut having a substantially U-shaped end view with the internal surfaces being reverse-turned walls, and the flexible securing members removably abutting against edges of the reverse-turned walls.

7. The apparatus of claim 6, wherein the flexible securing member further includes outwardly extending tabs that abut against edges of the reverse-turned walls.

8. The apparatus of claim 1, wherein:
    the spring is an elongated member internally folded from a top wall of the panel retainer;
    the panel retainer is removeable from the grounding clip in a substantially linear and screw-free manner;
    the solar panel frame is removeable from the grounding clip in a substantially linear and screw-free manner; and
    the grounding clip is removeable from an elongated support in a substantially linear and screw-free manner.

9. A solar panel assembly attachment apparatus comprising:
    an elongated and rigid strut including a pair of opposed internal surfaces defining a channel therebetween;
    a solar panel frame including a lateral flange;
    a clip comprising a housing defining a housing slot, the housing being coupled to flexible securing wings; and
    a panel retainer fitting within a housing of the clip and defining a panel slot which aligns with the housing slot when the panel retainer is within the housing;
    the flange of the frame being linearly received in the aligned housing slot and panel slot;
    the flexible securing wings being linearly inserted into the channel of the strut so the flexible securing wings snap into engagement with the internal surfaces of the strut; and
    the clip attaching the frame to the strut.

10. The apparatus of claim 9, further comprising a second clip including a housing defining a housing slot having a plurality of barbs, the housing being coupled to the flexible securing wings with a brace.

11. The apparatus of claim 10, wherein the clips are laterally spaced apart with the flexible securing wings being centrally located therebetween.

12. The apparatus of claim 9, wherein the clip is metallic and directly contacts against the flange of the frame which is also metallic, and the panel retainer is a separate part removeable from the clip.

13. The apparatus of claim 9, wherein the clip further includes at least four spaced apart barbs which cut into at least one coated surface of the flange of the frame when installed.

14. The apparatus of claim 9, further comprising a glass solar panel mounted to the frame and hiding a majority of the clip when completely attached to the strut, the strut having a substantially U-shaped end view with the internal surfaces being reverse-turned walls, and the wings removably abutting against edges of the reverse-turned walls.

15. The apparatus of claim 9, wherein the clip includes at least one barb which electrically grounds the clip to the frame, and a flexible member internally extends from the panel retainer to bias the frame toward the at least one barb.

16. The apparatus of claim 9, wherein the clip and panel retainer removeably secure the frame to the strut free of a threaded fastener.

17. A solar panel assembly attachment apparatus comprising:
(a) a strut defining a U-shaped channel;
(b) a first electrically conductive grounding clip comprising a housing adapted to be flexibly secured within the channel and tabs to abut a downwardly turned edge of the strut to resist removal of the clip, and further defining at least one first window;
(c) a second electrically conductive grounding clip comprising a housing adapted to be flexibly secured within the channel and tabs to abut a downwardly turned edge of the strut to resist removal of the clip, and further defining at least one second window; and
(d) a bridge providing an electrical connection between the first electrically conductive grounding clip and the second electrically conductive grounding clip, wherein the bridge further comprises a first barb to gouge the first grounding clip and a second barb to gouge the second grounding clip and a first tab having an interference fit with the at least one first window and a second tab having an interference fit with the at least one second window.

18. The apparatus of claim 17, wherein the first electrically conductive grounding clip and the second electrically conductive grounding clip include barbs to gouge a solar panel frame to provide an electrical connection and a ground to the solar panel frame.

19. The apparatus of claim 17, further comprising solar panel frames and solar panels attached to the frames, a first of the frames being removeably secured within a slot in the housing of the first clip in a screw-free manner, and a second of the frames being removeable secured within a slot in the housing of the second clip in a screw-free manner.

20. The apparatus of claim 17, wherein the clips are all stamped metal and the tabs of the clips are flexibly snapped into the strut.

21. A method of grounding a solar panel frame and attaching the frame to a rigid strut, the method comprising:
(a) linearly pushing a metallic clip onto a portion of the solar panel frame;
(b) compressing at least one barb of the clip into the portion of the frame while simultaneously compressing a spring retained within the clip; and
(c) flexibly snapping wings of the clip into the rigid strut;
wherein the clip provides grounding for the frame and attaches the frame to the strut in at least one primarily linear unthreaded installation motion.

22. The method of claim 21, further comprising attaching a bridge between the clips to provide an electrical connection.

23. The method of claim 22, further comprising gouging a portion of each respective clip with a portion of the bridge.

24. The method of claim 22, wherein the flexibly snapping wings each further define a window and further comprising locking the bridge to the clips by advancing a tab on the bridge through at least one window.

25. The method of claim 22, wherein connecting the clips with the bridge provides a continuous electrical connection for grounding the solar panel frame.

26. The method of claim 21, further comprising pre-assembling the clip to the frame off-site in a factory.

27. The method of claim 21, further comprising pre-assembling the clip to the frame prior to attachment of the clip or frame to the strut.

28. The method of claim 21, further comprising linearly pushing a second clip onto a portion of the solar panel frame.

* * * * *